United States Patent [19]

Omata

[11] Patent Number: 5,398,232
[45] Date of Patent: Mar. 14, 1995

[54] OPTICAL RECORDING MEDIUM WITH PREPIT AREAS HAVING REFLECTIVITY HIGHER THAN LAND AREAS

[75] Inventor: Hiroshi Omata, Kawasaki, Japan

[73] Assignee: Canon Kabushiki Kaisha, Tokyo, Japan

[21] Appl. No.: 922,777

[22] Filed: Jul. 31, 1992

[30] Foreign Application Priority Data

Aug. 6, 1991 [JP] Japan .................. 3-196621

[51] Int. Cl.$^6$ .................................. G11B 7/24
[52] U.S. Cl. .................... 369/275.4; 369/283
[58] Field of Search ............... 369/275.1, 275.3, 275.4, 369/283, 286, 288; 428/64, 65; 430/945; 346/76 L, 135.1

[56] References Cited

U.S. PATENT DOCUMENTS

| | | | |
|---|---|---|---|
| 4,614,951 | 9/1986 | Osato et al. | 346/135.1 |
| 4,716,063 | 12/1987 | Uehara et al. | 428/65 |
| 4,777,068 | 10/1988 | Omata et al. | 428/69 |
| 4,841,515 | 6/1989 | James | 369/100 |
| 5,059,510 | 10/1991 | Jones, Jr. et al. | 430/270 |
| 5,080,946 | 1/1992 | Takagisi et al. | 428/64 |
| 5,144,552 | 9/1992 | Abe | 369/275.4 |
| 5,274,623 | 12/1993 | Usami et al. | 369/275.1 |

FOREIGN PATENT DOCUMENTS

64-072342  3/1989  Japan .................. 369/283

*Primary Examiner*—Paul M. Dzierzynski
*Assistant Examiner*—James Beyer
*Attorney, Agent, or Firm*—Fitzpatrick, Cella, Harper & Scinto

[57] ABSTRACT

An optical recording medium is provided with optical guide grooves and prepits representing for example address data, in a land portion sandwiched between the grooves. The reflectivity in the bottom portion of the prepits is made higher than that of the land portion. An antireflection film is provided on the medium such that, in case where the reflectivity of the antireflection film decreases with the increase in the thickness of the antireflection film, the thickness of the antireflection film on the bottom of the prepits is selected smaller than that on the land portion. In the case where reflectivity of the antireflection film increases with the increase in the thickness of the antireflection film, the thickness of the antireflection film on the bottom of the prepits is selected larger than that on the land portion.

5 Claims, 4 Drawing Sheets

OPTICAL RECORDING MEDIUM WITH PREPIT AREAS HAVING REFLECTIVITY HIGHER THAN LAND AREAS

BACKGROUND OF THE INVENTION

1. Field of the Invention

The present invention relates to an optical recording medium on which recording, reproduction and erasure of information are conducted with a light beam.

2. Related Background Art

The conventional optical recording medium is provided with prepits, as shown in FIG. 1, in a so-called land area sandwiched between optical guide grooves. The prepits are recesses of a depth of λ/4n (λ: wavelength of reading light, n: refractive index of substrate) and represent address data. The amount of light reflected by the medium becomes smaller or larger depending on the presence or absence of a prepit, thereby allowing reproduction of the address data.

More specifically, the light irradiating said land area and reflected therefrom becomes weaker in the position of a prepit, because of the interference between the light reflected from the land surface and that reflected from the bottom of the prepit. In this manner the reflected light amount is modulated by the presence or absence of the prepit, so that the information can be reproduced.

However, the above-mentioned conventional optical recording medium has been associated with a drawback that, if the length or interval of prepits is shortened to achieve a higher recording density, the signal output (difference in light and dark states of the reflected light) for a constant diameter of reading light spot becomes lower and the address data cannot be reproduced. This is because a sufficient amount of reflected light cannot be obtained, when the reading light spot is positioned between the prepits, due to the influence of the prepits positioned in front of and behind the light spot, in comparison with a situation where the reading light spot is positioned on a prepit. On the other hand, if the prepits are reduced in size for decreasing such influence, the reflected light amount cannot be decreased sufficiently when the reading light spot is positioned on the prepit. Thus, despite a change in the shape of the prepits, a sufficient signal output cannot be obtained with a constant reading light spot, in a portion where the intervals of pits are short because the recording density of the address data is increased.

SUMMARY OF THE INVENTION

In consideration of the foregoing, the object of the present invention is to provide an optical recording medium which is free from the reduction in the signal output (different between light and dark states) even in case the intervals between prepits are reduced to increase the recording density.

The above-mentioned object can be attained, according to the present invention, by an optical recording medium provided with optical guide grooves and prepits, representing for example address data, in a land portion sandwiched between said grooves, wherein the reflectivity of the bottom of said prepits is made higher than that of said land portion.

DETAILED DESCRIPTION OF THE PREFERRED EMBODIMENTS

Figure 5:
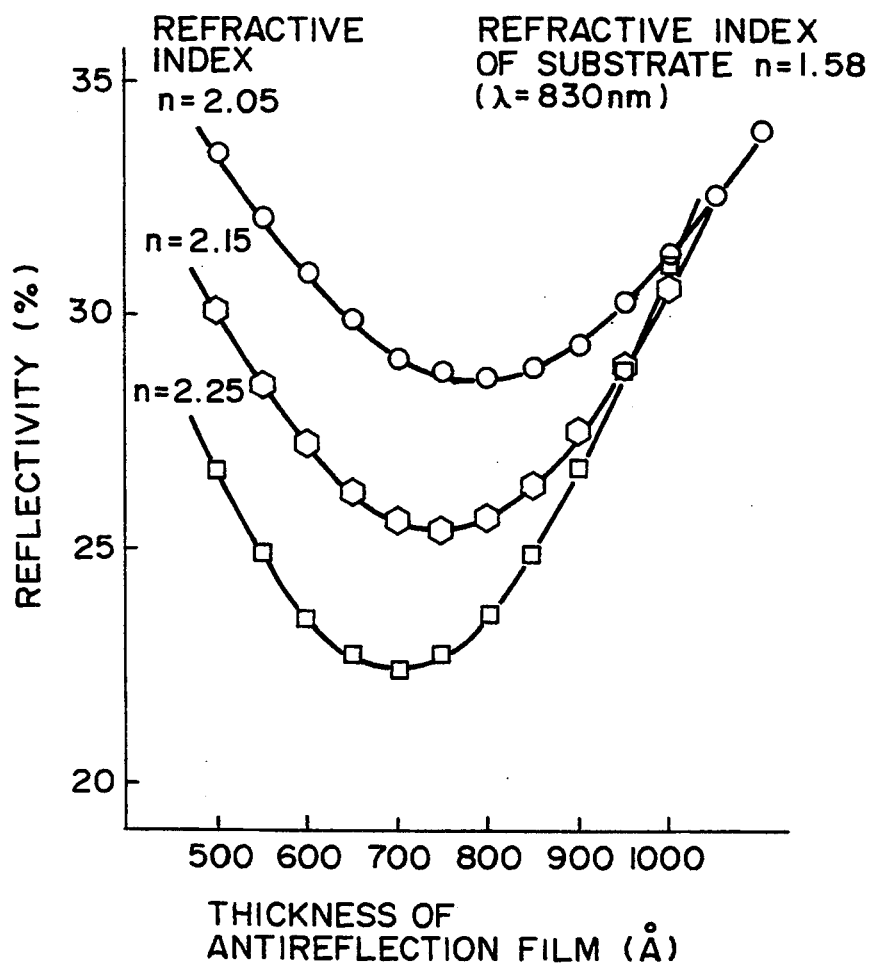
FIG. 5 is a chart showing the change in reflectivity as a function of the thickness of the antireflection film.

In general, the optical recording medium is provided, on the surface of the substrate, with an antireflection film of a refractive index larger than that of the substrate, for the purpose of regulating the reflectivity. A desired reflectivity can be obtained, as shown in FIG. 5, by suitable selection of the refractive index and the thickness of said antireflection film. The reflectivity naturally varies for different thicknesses, even if the refractive index is constant. Thus, according to the present invention, the reflectivity at the bottom of the prepit is made higher than that of the land surface, by varying the thickness of the antireflection film between the bottom of prepits and the land surface. Thus, when the reading light spot is positioned on a prepit, there can be obtained a larger reflected light amount from the prepit bottom even from a smaller-sized prepit, thereby inducing a sufficient interference between the reflected light from the prepit bottom and that from the land surface to sufficiently reduce the reflected light amount. Also the reflected light amount when the reading light spot is positioned between the prepits can be increased by the size reduction of the prepits, so that the signal output is not decreased by a reduction in the interval of prepits for increasing the recording density.

EMBODIMENT 1

In the following there will be explained a first embodiment, with reference to the attached drawings.

Figure 1:
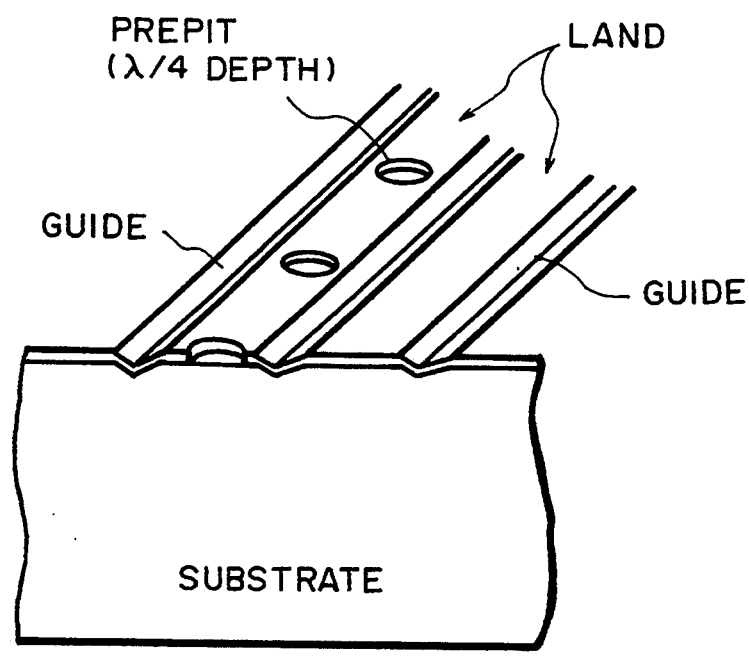
FIG. 1 is a perspective view of a conventional optical recording medium.
Figure 2:
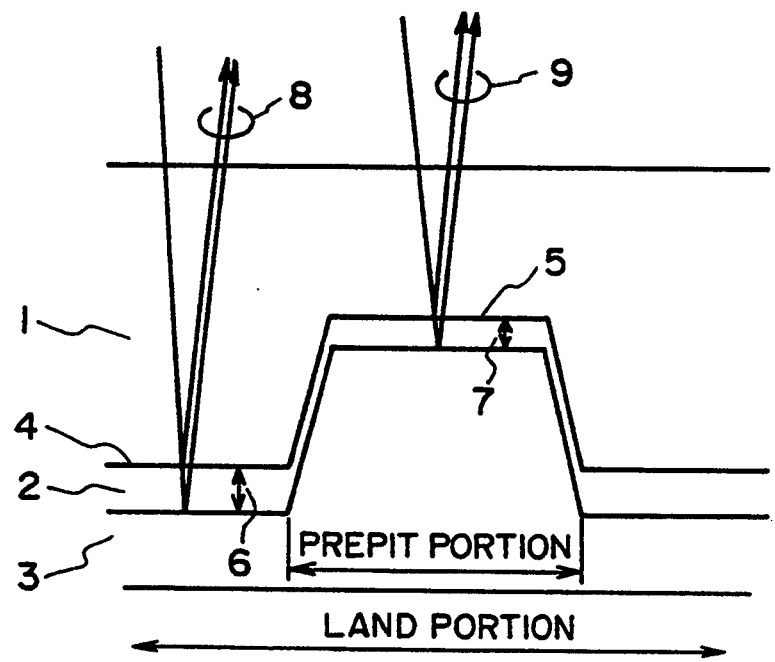
FIG. 2 is a cross-sectional view of a first embodiment of the optical recording medium of the present invention.

FIG. 2 is a cross-sectional view of a first embodiment of the optical recording medium of the present invention.

Figure 4:
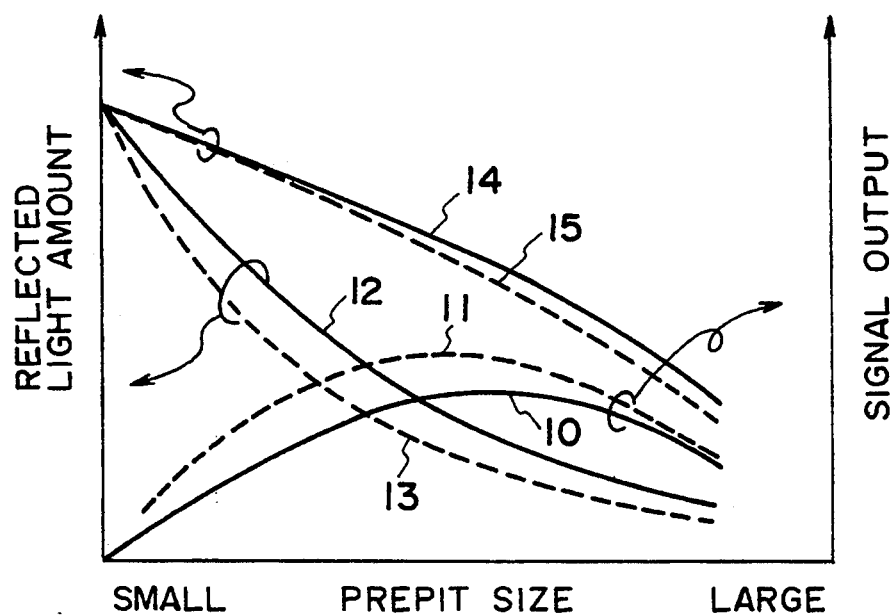
FIG. 4 is a chart showing the effect of the present invention.

The optical recording medium of the present embodiment is composed of a transparent substrate 1 for example of polycarbonate, a recording layer 3 of a rare earth-transition metal amorphous alloy such as TbFeCo, and an antireflection film 2 for example of $Si_3N_4$ provided between said substrate 1 and recording layer 3. The thickness 6 of the anti-reflection film in a land portion 4 is made larger than the thickness 7 of the antireflection film at a prepit bottom 5. As will be apparent from FIG. 5, for any refractive index, there exists a region in which the reflectivity decreases with an increase in the film thickness and another region in which the reflectivity increases with an increase in the film thickness, said regions being separated by a certain film thickness. The present embodiment utilizes the effect in the former region. As explained above, the thickness 7 of the antireflection film at the prepit bottom 5 is smaller than the thickness 6 of the antireflection film in the land portion 4, so that, according to FIG. 5, the reflectivity at the prepit bottom 5 becomes higher than that of the land portion 4. Thus the reflected light amount 9 from the prepit bottom 5 becomes larger than in the ordinary state, or the effect of the ordinary pit can be attained with a smaller pit. The relationship among the prepit size, reflected light amount and signal output is illustrated in FIG. 4. Because of the reason explained above, the reflected light amount 13 in case the reading light spot is positioned just on a prepit of the present embodiment is shifted to a smaller prepit size in comparison with that 12 of the conventional configuration. On the other hand, when the reading light spot is positioned between the prepits, the reflected light amounts 15, 14 respectively in the present embodiment and in the conventional configuration do not differ as much as the difference between the reflected light amounts 12, 13. Consequently the signal output, obtained as the difference in the reflected light amount between a state just above a prepit and a state between prepits, becomes larger in the present embodiment, as indicated by 11, than in the conventional configuration indicated by 10. Such anti-reflection film 2 can be obtained, for example, in the deposition of a dielectric film such as of silicon nitride on the substrate 1 by RF or DC sputtering, by selecting a larger (negative) sheath voltage of the substrate for the plasma, thereby retarding the film deposition in the recesses (prepits) in comparison with that in the flat areas (lands 4) of the substrate 1.

EMBODIMENT 2

Figure 3:
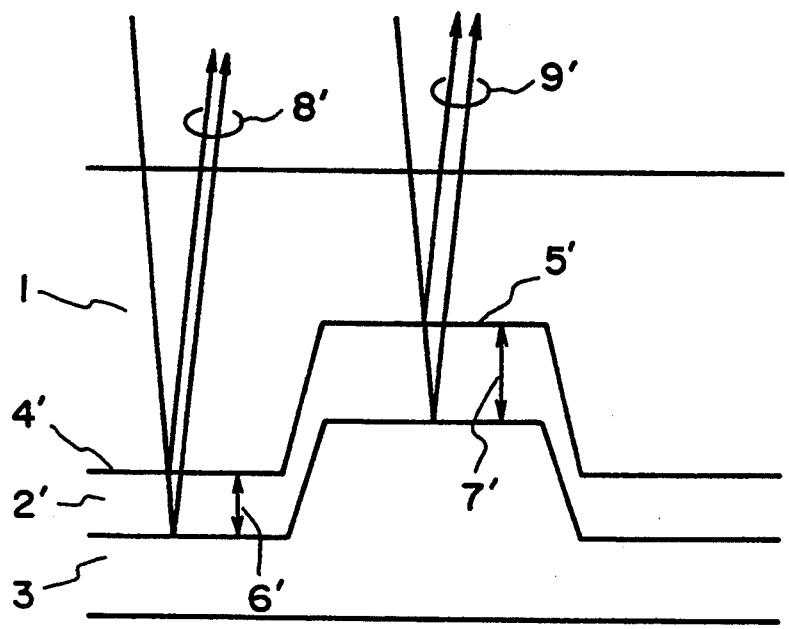
FIG. 3 is a cross-sectional view of a second embodiment of the optical recording medium of the present invention.

FIG. 3 is a cross-sectional view of a second embodiment of the optical recording medium of the present invention.

Figure 6:
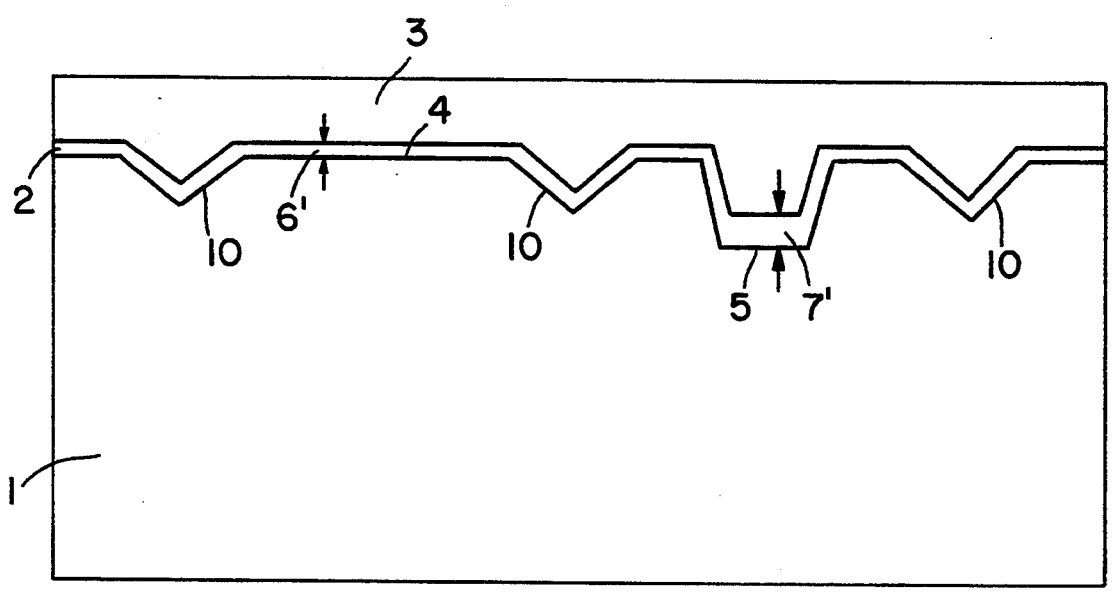
FIG. 6 is a cross-sectional view of the embodiment shown in FIG. 3 which illustrates the guide grooves.

In this embodiment, the thickness 7' of the antireflection film 2' in the prepit bottom 5 is selected larger than the thickness 6' of that on the land area 4, in order to utilize, in contrast to the foregoing first embodiment, an area in which the reflectivity increases with the increase in the thickness of the antireflection film. This configuration also provides an improved signal output, in a similar manner as in the first embodiment. Such antireflection film 2' can be provided, for example, in the deposition of a dielectric film such as of silicon nitride on the substrate 1 by RF or DC sputtering, by selecting a smaller (negative) sheath voltage of the substrate 1 for the plasma, thereby facilitating the film deposition, in the recessed portions (prepits) than on the flat areas (lands 4) of the substrate 1. Guide grooves 20, as in a conventional medium, are shown in FIG. 6.

In these embodiments, the difference in the thickness of the antireflection film between the prepit bottom and the land area is preferably 100 Å or larger.

As explained in the foregoing, the present invention provides an advantage of not reducing the output signal level in an area of short prepit intervals even when said interval is made shorter, by designing the reflectivity on the prepit bottoms higher than that on the land portions.

What is claimed is:

1. An optical recording medium comprising:
   a groove portion having a plurality of grooves;
   a land portion disposed between the grooves of said groove portion; and
   a prepit portion comprising a recess formed in said land portion,
   wherein a reflectivity in a bottom portion of said prepit is higher than that of a surface of said land portion.

2. An optical recording medium comprising:
   a substrate;
   a groove portion, having a plurality of grooves, provided on said substrate;
   a land portion provided on said substrate and disposed between the grooves of said groove portion;
   a prepit portion comprising a recess formed in said land portion;
   an antireflection film laminated on said substrate; and
   a recording layer laminated on said antireflection film,
   wherein a reflectivity in a bottom portion of said prepit portion is higher than that of a surface of said land portion due to a difference between a thickness of said antireflection film on said prepit portion and on said land portion.

3. An optical recording medium according to claim 2, wherein the thickness of said antireflection film on said prepit portion is greater than the thickness of said antireflection film on the surface of said land portion.

4. An optical recording medium according to claim 2, wherein the thickness of said antireflection film on said prepit portion is smaller than the thickness of said antireflection film on the surface of said land portion.

5. An optical recording medium comprising:
   a substrate;
   a pair of grooves formed in said substrate; and
   a land area provided on said substrate and disposed between said pair of grooves, said land area having therein a recess formed in said substrate, the recess being a prepit and a bottom of the prepit having a higher reflectivity than a surface of said land portion.

* * * * *